United States Patent

[11] 3,614,754

[72] Inventor Stewart E. Cummins
 11810 Stafford Road, New Carlisle, Ohio 45344
[21] Appl. No. 807,753
[22] Filed Mar. 17, 1969
[45] Patented Oct. 19, 1971

[54] FERROELECTRIC GADOLINIUM MOLYBDATE COMPENSATION TYPE BISTABLE LIGHT GATE AND LOGIC CELL HAVING MEMORY
6 Claims, 6 Drawing Figs.

[52] U.S. Cl. .................................................. 340/173.2, 350/150
[51] Int. Cl. ..................................................... G02f 1/26, G11c 11/22, G11c 13/04
[50] Field of Search ............................................ 340/174.1 MO, 173, 173.2; 350/150; 353/25

[56] References Cited
UNITED STATES PATENTS

| | | | |
|---|---|---|---|
| 2,705,903 | 4/1955 | Marshall | 350/150 |
| 2,936,380 | 5/1960 | Anderson | 340/173 UX |
| 3,167,607 | 1/1965 | Marks | 350/150 |
| 3,239,671 | 3/1966 | Buhrer | 350/150 X |
| 3,407,017 | 10/1968 | Fleisher | 350/150 |

OTHER REFERENCES

Cummins, Crystal Symmetry, Optical Properties and Ferroelectric Polarization of $Bi_4Ti_3O_{12}$ Single crystals, 1/67, Applied Physics Letters, Vol. 10, No. 1, 340– 173 LS Primary Examiner—Terrell W. Fears
Assistant Examiner—Stuart Hecker
Attorneys—Harry A. Herbert, Jr. and Robert Kern Duncan ABSTRACT: Two, electroded, birefringent, bistable crystals of ferroelectric gadolinium molybdate are aligned along their crystallographic c axis between crossed optical polarizers. When the two crystals have their respective spontaneous polarization switched by an electrical pulse so that the directions of their a and b axes respectively coincide, the retardations add, and when they are switched so that the a direction of one crystal aligns with the b direction of the other crystal the retardations subtract. In the former instance light is passed, in the latter no light is transmitted through the crystals and crossed polarizers. Each bistable ferroelectric gadolinium molybdate crystal has memory in that only an electrical pulse is required to bring about a change of state which is retained until the crystal is conversely pulsed.

INVENTOR.
STEWART E. CUMMINS

INVENTOR.
STEWART E. CUMMINS
BY Harry A. Herbert Jr
and
Robert Ken Duncan
ATTORNEYS

3,614,754

FERROELECTRIC GADOLINIUM MOLYBDATE COMPENSATION TYPE BISTABLE LIGHT GATE AND LOGIC CELL HAVING MEMORY

BACKGROUND OF THE INVENTION

The field of this invention is in light gate devices having memory.

The state of the art concerning ferroelectric bistable light gate devices is exemplified by my former U.S. Pat. No. 3,374,473 entitled "Bistable Optically Read Ferroelectric Memory Device," and my pending application Ser. No. 804,872 filed Mar. 6, 1969 entitled "Ferroelectric Gadolinium Molybdate Bistable Light Gate-memory Cell." These prior art devices have had the disadvantage of having to have the light enter the crystal at an angle to the c axis of the crystal. This either required that the light not enter normal to the crystal face or that the crystal be cut off-axis; the former situation results in a relatively inefficient device and the latter has the complications associated with making the off-axis cut. No inherent temperature compensation has been provided to compensate for the changes in the crystal characteristics with changes in the ambient temperature.

SUMMARY OF THE INVENTION

A bistable light gate having two electrical read-in circuits with nondestructive optical readout is provided. Each read-in circuit has memory, and may be initiated by a momentary pulse. The read-in pulses may be coincidental or separated in time. Conventional light gate control, with memory, may be had by actuating either read-in circuit. The logic function of an exclusive OR gate or an exclusive NOR gate (exclusive OR-negated) with memory and having nondestructive readout is provided. In addition, inherent temperature compensation is provided.

DESCRIPTION OF THE PREFERRED EMBODIMENT

This invention utilizes the change in the sign of the elongation, i.e., the interchange of the "fast" and "slow" optical directions in gadolinium molybdate, $Gd_2(MoO_4)_3$, crystals to provide an electrically controlled bistable light gate. When two birefringent crystal elements are arranged between crossed polarizers the individual retardation, ($\Delta$), of the crystals will add or subtract depending on the relative optical orientation of the two elements. In this invention the crystal elements are cut to the same thickness thus they have equal retardation characteristics so that when the optical orientations are opposite the effect is complete compensation, so that no light is transmitted, for any rotation position, when the two crystal elements are viewed between crossed polarizers. Reversal of the ferroelectric polarization of either crystal element results in an interchange of the fast and slow vibration directions for that crystal, thus giving electrical control of the relative crystal orientations. When these directions in the two crystals are opposed they compensate giving no net birefringence and no light transmission. When the directions are the same, the birefringence adds and the combination very efficiently transmits light. The frequency characteristic of the transmitted light is broadly tuned by the relationship of the sum of the retardations to the wavelength of light as will be further explained.

Inherent temperature compensation of the device is provided due to the fact that any change in the retardation, $\Delta$, of one crystal, with changes in temperature, will be accompanied by a similar change in $\Delta$ in the other crystal. Since the extinction condition of the device occurs when the two retardations compensate each other extinction will not be affected by changes in the environmental temperature of the device. In the on, or light transmitting state, where the retardations add, changes in the ambient temperature will theoretically shift the center of the passband light transmission characteristic a small amount. In general this shift in the center of the passband has been found to be insignificant in the operation of the device.

Figure 1:
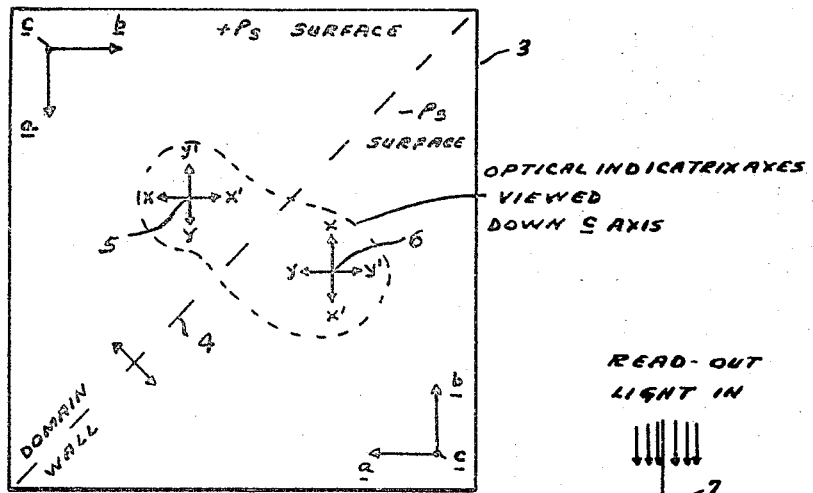
FIG. 1 shows the change in the optical indicatrix orientation in a crystal element of gadolinium molybdate with changes in the direction of spontaneous polarization.
Figure 6:
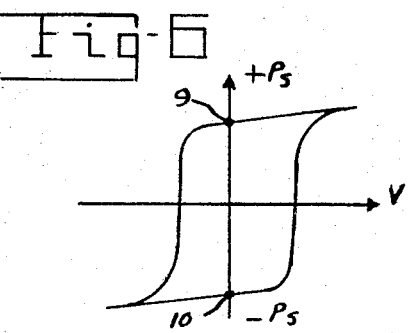
FIG. 6 shows a typical hysteresis characteristic of the ferroelectric material.

Referring to FIG. 1, a crystal element 3 is cut along they crystallographic axes from a single crystal of the ferroelectric material gadolinium molybdate. This is a bistable birefringent material having ferroelectric domain walls essentially at 45° to the a and b axes, that is, in the plane with the general Miller indices (110). For illustrative purposes the crystal 3 is shown having the domain wall 4 with spontaneous polarization $P_S$ on the upper left-hand portion of the crystal opposite from that on the lower right-hand portion. Changing the direction of the spontaneous polarization changes (interchanges) the crystallographic a and b axes and the crystal optical indicatrix axes. The fast X—X' and slow Y—Y' indicatrix axes also change by 90° as shown (5 and 6) by changing the spontaneous polarization. In this invention essentially the complete crystal element is polarized in either one direction or the other so in effect the domain wall 2 sweeps essentially completely across the crystal in either one direction or the other depending upon the polarity of the spontaneous polarization present in the crystal. (If the crystal is supported by clamping at its edges the polarization may not change in the immediate vicinity of the clamp.) The crystal faces normal to the c axis are coated with conventional transparent electrodes and a momentary electrical pulse of determined polarity is applied to the electrodes for determining the residual spontaneous polarity of the crystal. A typical hysteresis characteristic is shown in FIG. 6 with the two points of spontaneous polarization shown at points 9 and 10.

Figure 2:
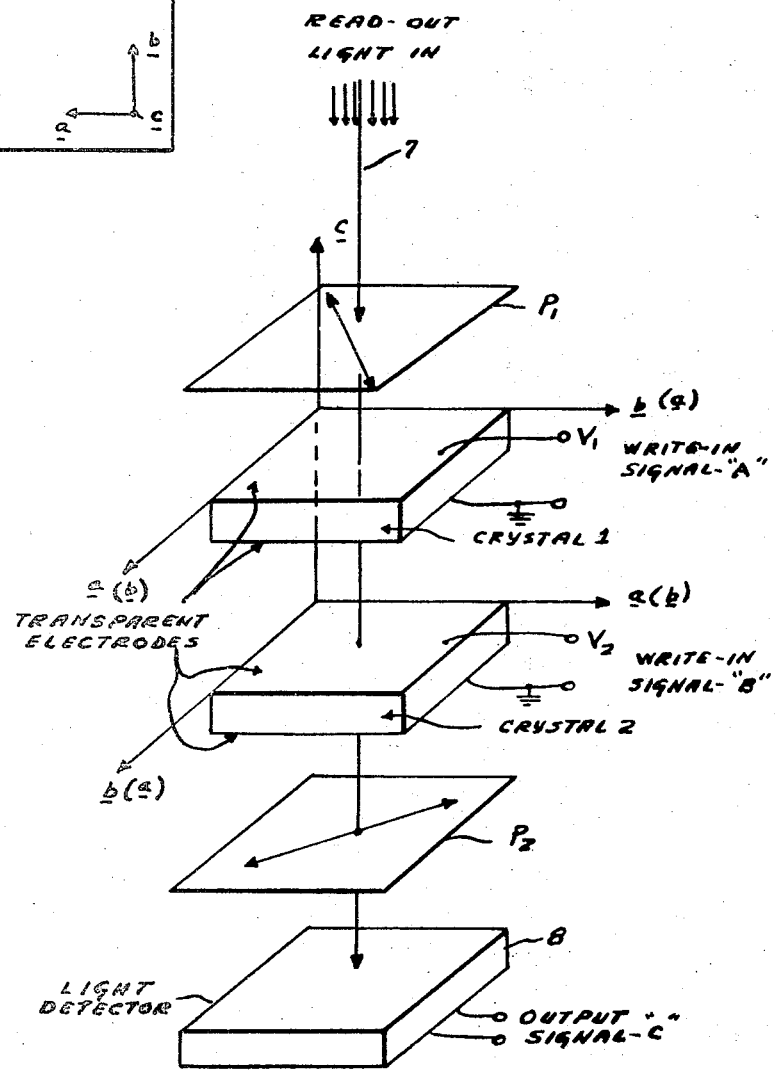
FIG. 2 shows the arrangement of the crystals and crossed polarizers in an embodiment of the invention.

A complete embodiment of the invention is shown in diagrammatical form in FIG. 2. The light path 7 is along the c axis in both crystal 1 and crystal 2. The crystals are elements cut to equal thickness along their c axes from single crystals of gadolinium molybdate, or they may both be cut from the same single crystal. Since the crystals are of equal thickness they have equal values of retardation ($\Delta$). When the directions of the a and b axes of the two crystals coincide, respectively, the retardations add and the total retardation is the sum of the two or $2\Delta$. If the a direction of one crystal aligns with the b direction of the other crystal, the retardations subtract, ($\Delta_1 - \Delta_2 = 0$), giving no light transmission through the system (the off state). The reason for this is due to the fact that since no retardation occurs no light will emerge from the crossed polarizers. When either the a and b axes of one, (not both), crystal are interchanged the retardations will add and light will be transmitted through the system, due to the extinction axes of crystal 1 and crystal 2 being positioned at approximately 45° to the direction of polarization of the crossed polarizers $P_1$ and $P_2$.

In prior art devices using a single crystal it is required that the crystal be carefully oriented between the crossed polarizers so as to properly position its extinction axis with respect to the directions of optical polarization. In the device of this invention it is required that the two crystals be aligned with their crystal a and b axes essentially parallel, but the orientation of the crystals between the crossed polarizers is not critical. When the crystals have the spontaneous polarization to place the device in extinction it will be in extinction for all angles of orientation of the crystals with respect to the directions of polarization of the crossed polarizers. When the crystals have the spontaneous polarization to provide the "on" state, that is light transmission through the crystals and crossed polarizers, light transmission will occur for all orientation positions except for the unique case when the polarization directions of the crossed polarizers are aligned with the $a$ and $b$ axes of the crystals. Thus fabrication of this device is much simpler than in the prior art devices. The location of the crossed polarizers at 45° to the crystallographic $a$ and $b$ axes as shown in FIG. 2 is merely to be considered an optimum position for ease of fabrication and not a critical position. As previously explained, gadolinium molybdate, $Gd_2(MoO_4)_3$, has the property of interchanging the $a$ and $b$ axes within the crystal when the ferroelectric polarization is reversed along the $c$ axis, thus one crystal (or both crystals) can be electrically controlled to obtain either situation described above.

In the embodiment shown in FIG. 2 the two crystals are cut to the same thickness along the $c$ axis and are oriented so their electro-optical characteristics have the same relative relationship. Thus a positive voltage at $V_1$ and a positive voltage at $V_2$ will cause the crystals to possess identical directions of spontaneous polarization and the $a$ axis of one crystal will be parallel with the $a$ axis of the other, and the system will be in the "on" state. When $V_2$ is (or has been) negative the $a$ and $b$ axes of crystal 2 will be interchanged and light will be blocked. This is the condition of the axes shown, not parenthetically, in FIG. 2. When the spontaneous polarization of one crystal (but not both) is changed the state of the device changes, i.e. from "on" to "off" or "off" to "on." When both states of spontaneous polarization are changed the state of the system does not change. Of course, it is to be understood that the gadolinium molybdate crystals are bistable ferroelectric devices and that only an electrical pulse is required to establish the state of their spontaneous polarization, and that the crystals will stay in that state (memory) until pulsed with a pulse of the opposite polarity. It is also to be understood that the physical orientation of the crystals may be changed (turned 90°) with corresponding changes in the relative polarities of the write-in signals for producing the "on" and "off" states. The grounding of one of the electrical input leads to the crystals as shown in FIG. 2 is not required. Both input terminals to each crystal may be "floating" with respect to any system ground, as it is only the relative potential between the terminals that determine the polarization vector.

The thickness of the crystal plates is chosen for good light transmission when the characteristics of the two are oriented the same and set out of extinction (the "on" state). As is well known, maximum light transmission occurs when the total retardation is a half wavelength (or odd multiples thereof, i.e., $\lambda/2$, $3\lambda/2$, etc.) of the light being transmitted. Since it is generally desirable to keep the crystals thin in the $c$ direction in order to keep the switching voltage low, the $\lambda/2$ value is generally preferred. In operating embodiments it has been found that total retardations appreciably less than the $\lambda/2$ value will still give very satisfactory light transmission. Operating embodiments with crystal elements of equal thickness in the range of 0.1 to 0.4 millimeters each, have given satisfactory operation with ordinary (white) light. A typical embodiment centered around light having a wavelength $\lambda$ of 580 millimicrons, ($2\Delta = 290$ m$\mu$) has equal individual crystal thickness of approximately 0.35 millimeters. The switching voltage pulse required to switch a crystal is determined by the coercive field characteristic of the crystal and the thickness of the crystal plate. The coercive field $E_c$ of gadolinium molybdate is approximately 5 kv./cm.; for an embodiment using crystals 0.2 mm. thick a voltage of approximately 150 volts have been found suitable for switching each crystal.

The embodiment of this invention shown in FIG. 2 may be used as a bistable light gate, with memory, with light control provided by either crystal, or both crystals, as previously explained. The utility of such devices is well known and thoroughly set forth in the prior art.

Further examination of the embodiment shown in FIG. 2 will reveal the following characteristics. When the write-in signal A has, or has last previously had, the polarity of a positive voltage at $V_1$ and write-in signal B has, or last previously had, the polarity of a positive voltage at $V_2$, light will be transmitted and an output signal voltage at C will be obtained from the light sensing detector 8. If the polarity at either A or B is reversed no output signal voltage will be present at C. If both write-in polarities are reversed a signal voltage will be present at C. Placing this on the conventional logic "1" and "0" notations and terming a positive voltage of the write-in signals A and B a "1" and an output voltage at C a "1"; and the opposite, or negative polarities at A and B a "0" and the no signal output condition at C a "0," the following table may be constructed.

| A | B | C |
|---|---|---|
| 1 | 1 | 1 |
| 1 | 0 | 0 |
| 0 | 0 | 0 |
| 0 | 0 | 1 |

Figure 3:
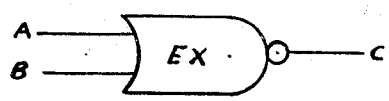
FIG. 3 shows in symbolic logic notation the basic logic function performed by the embodiment of FIG. 2.
Figure 5:
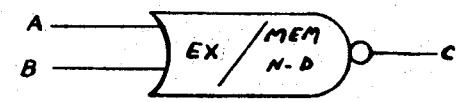
FIG. 5 is a symbolic logic symbol of an embodiment of the invention.
Figure 4:
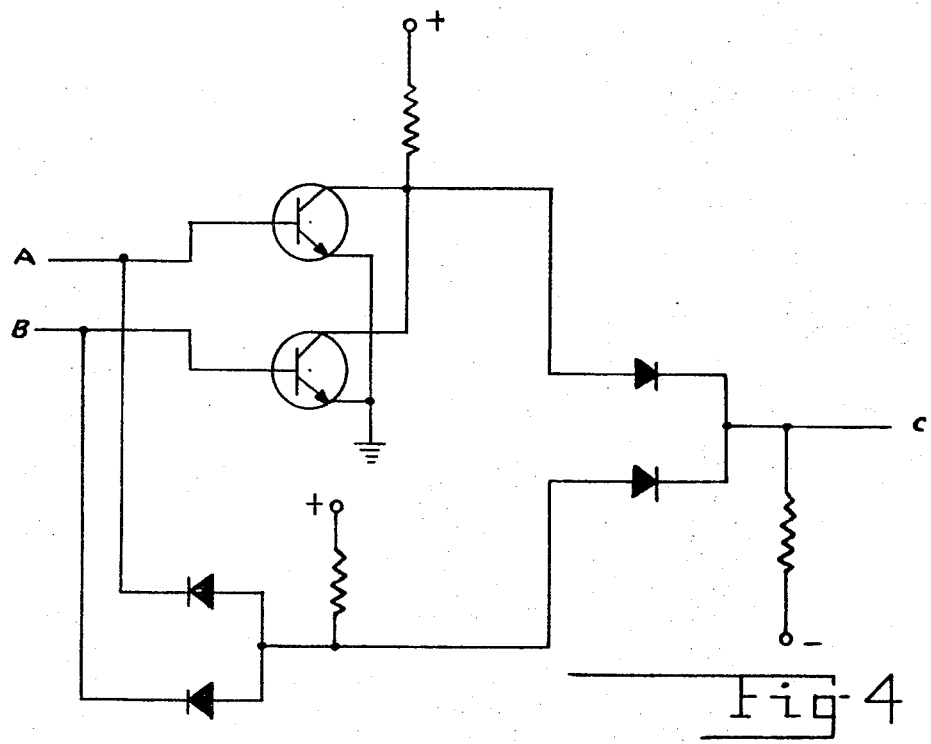
FIG. 4 is a simplified schematic diagram of a solid state equivalent of the embodiment shown in FIG. 2 less the advantages of memory and nondestructive readout.

Those skilled in the art will readily recognize this as the characteristics of an exclusive OR gate-negated, or an exclusive NOR gate. This function is represented by the conventional logic symbol shown in FIG. 3. A simplified solid state electronic schematic circuit to provide this function is shown in FIG. 4 it is to be noted that while the circuitry of FIG. 4 provides the exclusive NOR gate function, it does not possess memory with nondestructive readout as provided by this invention. As is well known, one extensive use that is made of exclusive NOR gates is for the determination if two serial binary numbers are identical. This invention provides the advantage that the two numbers being compared do not have to be presented simultaneously in time. In addition, repeated readouts or continuous readout may be had without destroying the stored information. The symbolic symbol (FIG. 5) is representative of the embodiment of this invention providing this logic function. It indicates an exclusive NOR gate with memory and nondestructive readout.

Using the same input logic it is to be observed that the rotation of either crystal 1 or crystal 2 90° about the $c$ axis will provide an exclusive OR gate as represented in logic notation, by the following table.

| A | B | C |
|---|---|---|
| 1 | 1 | 0 |
| 1 | 0 | 1 |
| 0 | 1 | 1 |
| 0 | 0 | 0 |

Exclusive OR gates are extensively used in adder and subtracter logic circuitry. As with the former embodiment, this embodiment of this invention in addition to performing the conventional logic function provides memory with nondestructive, continuous or intermittent, readout. In practicing this invention other birefringent ferroelectric crystals having orthorhombic, point group mm. 2, symmetry with a fixed relationship between the sign of $P_S$ (along the $c$ axis) and the relative position of the $a$ and $b$ axes, such as the molybdates of the rare-earth elements may be used in place of the molybdate of gadolinium crystals herein described in detail.

I claim:

1. An electrically controlled light gate device comprising:
   a. a first crystal element and a second crystal element having the same electrical and optical characteristics cut along the crystallographic axes from a single ferroelectric birefringent crystal of a molybdate of a rare-earth element, each having parallel faces normal to the crystallographic $c$ axis;
   b. first and second light polarizers having polarization directions at right angles;

c. means for passing light through the first polarizer, the first crystal element, the second crystal element, and the second polarizer in succession in a direction normal to the parallel faces of the first and second crystal elements;

d. transparent electrodes on the parallel surfaces of the first and second crystal elements for selectively applying an electric pulse of either polarity therebetween for gating the said light; and e. means for sensing the light that has passed through the second polarizer.

2. The light gate as claimed in claim 1 wherein the said single crystal is a single crystal of gadolinium molybdate.

3. A dual electrically controlled light gate device having memory comprising:

a. a first crystal element and a second crystal element having the same electrical and optical characteristics cut from a single crystal of the ferroelectric material $GD_2(MoO_4ch3$ along the crystallographic axes of the crystal providing parallel crystal faces normal to the crystallographic $c$ axis;

b. the said first and second crystal elements positioned in axial spaced apart parallel planar relationship along their respective $c$ axis with their respective $a$ and $b$ axes in parallel relationship;

c. first and second light polarizers having polarization directions at right angle;

d. means for passing light through the first polarizer, the first crystal element, the second crystal element and the second polarizer in succession in a direction parallel to the $c$ axis of the crystal elements;

e. transparent electrodes on the parallel faces normal to the crystallographic $c$ axis of the first crystal element and the second crystal element for selectively applying independently to each crystal element an electric pulse of either polarity for changing the state of the spontaneous polarization of the element; and f. means for sensing the light that has passed through the second polarizer.

4. A dual electrically controlled light gate device having memory for controlling the passage of light comprising:

a. a first crystal element and second crystal element having the same electrical and optical characteristics cut from a single crystal of the ferroelectric material $Gd_2(MoO_4)_3$ along the crystallographic $a$, $b$, and $c$ axes of the crystal providing crystal plates having a predetermined thickness along the $c$ axis determined by the wavelength of the said light;

b. the said first and second crystal elements positioned in axial spaced apart parallel planar relationship along their respective $c$ axis with their respective $a$ and $b$ axes in parallel relationship;

c. first and second light polarizes having polarization directions at right angles positioned in parallel planar relationship with the first and second crystal elements, and having the said polarization directions at approximately an angle of 45° with the crystallographic $a$ and $b$ axes of the crystal elements;

d. means for passing light through the first polarizer, the first crystal element, the second crystal element and the second polarizer in succession in a direction parallel to the $c$ axis of the crystal elements;

e. transparent electrodes on the first and second crystal elements for selectively applying independently an electric field of either polarity to each crystal along the $c$ axis of the crystal for changing the state of spontaneous polarization of the crystal element; and f. means for sensing the light that has passed through the second polarizer.

5. An exclusive NOR gate having memory and nondestructive optical readout comprising:

a. a first electrical element and a second crystal element having the same electrical and optical characteristics cut from a single crystal of the ferroelectric material $Gd_2(MoO_4)_3$ along the crystallographic $a$, $b$, and $c$ axes of the crystal providing parallel crystal faces normal to the $c$ axis;

b. transparent electrodes on the parallel faces normal to the $c$ axis of each crystal element for selectively applying, independently, an electrical pulse of either positive or negative polarity for changing the direction of the state of spontaneous polarization parallel to the $c$ axis of the crystal element;

c. the first and second crystal elements positioned in parallel relationship along their $c$ axes with their respective $a$ and $b$ axes in parallel relationship for like directions of spontaneous polarization;

d. first and second light polarizers having polarization directions at right angles, positioned parallel to the said parallel crystal faces, and having the said polarization directions at approximately an angle of 45° with the crystallographic $a$ and $b$ axes of the crystal elements;

e. means for passing light through the first polarizer, the first crystal element, the second crystal element, and the second polarizer in succession in a direction parallel to the $c$ axes of the crystal elements; and f. means for sensing the light that has passed through the second polarizer and providing an output responsive to the said directions of spontaneous polarization in the crystal elements.

6. An exclusive OR gate having memory and nondestructive optical readout comprising:

a. a first crystal element and a second crystal element having the same electrical and optical characteristics cut from a single crystal of the ferroelectric material $Gd_2(MoO_4)_3$ along the crystallographic $a, b,$ and $c$ axis of the crystal providing parallel crystal faces normal to the $c$ axis;

b. transparent electrodes on the parallel faces normal to the $c$ axis of each crystal element for selectively applying, independently, an electrical pulse of either positive or negative polarity for changing the direction of the state of spontaneous polarization parallel to the $c$ axis of the crystal element;

c. the first and second crystal elements positioned in parallel relationship along their $c$ axes with the $a$ axis of the first crystal element aligned in parallel relationship with the $b$ axis of the second crystal element for like directions of spontaneous polarization;

d. first and second light polarizers having polarization directions at right angles, positioned parallel to the said parallel crystal faces, and having the said polarization directions at approximately an angle of 45° with the crystallographic $a$ and $b$ axes of the crystal elements;

e. means for passing light through the first polarizer, the first crystal element, the second crystal element, and the second polarizer in succession in a direction parallel to the $c$ axes of the crystal elements; and f. means for sensing the light that has passed through the second polarizer and providing an output responsive to the said directions of spontaneous polarization in the said crystal elements.